United States Patent [19]

Irving

[11] 4,387,216

[45] Jun. 7, 1983

[54] HEAT-POLYMERIZABLE COMPOSITIONS COMPRISING EPOXIDE RESINS, AROMATIC SULFOXONIUM SALTS, AND ORGANIC OXIDANTS

[75] Inventor: Edward Irving, Burwell, England

[73] Assignee: Ciba-Geigy Corporation, Ardsley, N.Y.

[21] Appl. No.: 372,892

[22] Filed: Apr. 29, 1982

[30] Foreign Application Priority Data

May 6, 1981 [GB] United Kingdom ............... 8113774

[51] Int. Cl.$^3$ .................. C08G 59/68; C08G 65/04
[52] U.S. Cl. ............................ 528/408; 528/89; 528/91; 528/92; 528/409
[58] Field of Search ............... 528/408, 409, 89, 91, 528/92

[56] References Cited

U.S. PATENT DOCUMENTS

| | | | |
|---|---|---|---|
| 3,442,901 | 5/1960 | Koenig et al. ............... | 260/294.8 |
| 4,227,978 | 10/1980 | Barton ........................ | 204/159.12 |
| 4,230,814 | 10/1980 | Crivello ...................... | 526/333 |
| 4,241,204 | 12/1980 | Crivello ...................... | 526/333 |
| 4,250,203 | 2/1981 | Schlesiager et al. ......... | 427/44 |
| 4,259,454 | 3/1981 | Crivello ...................... | 521/113 |
| 4,284,753 | 8/1981 | Hewitt, Jr. .................. | 528/89 |
| 4,299,938 | 11/1981 | Green et al. ................ | 528/408 |
| 4,339,567 | 7/1982 | Green et al. ................ | 528/409 |

FOREIGN PATENT DOCUMENTS 1516511 7/1978 United Kingdom .

OTHER PUBLICATIONS

Corey and Chaykovsky, J. Amer. Chem. Soc. 1962, 84, 867.
Takebayashi et al., Chemistry Letter, 1973, 809–812.
König and Metzger, Chem. Ber., 1965, 98, 3733–3747.
Tsuge et al., Tetrahedron, 1973, 29, 1983–1990.

*Primary Examiner*—Lucille M. Phynes
*Attorney, Agent, or Firm*—Harry Falber

[57] ABSTRACT

Certain classes of aromatic sulfoxonium salts, such as dimethylphenacylsulfoxonium and acetanilinodimethylsulfoxonium hexafluorophosphates, have little or no effect on prolonged heating with O-glycidyl group-containing epoxides. It has now been found that if a quinone, peroxide, or iodoso aromatic compound is also added, the sulfoxonium salts rapidly bring about the polymerization of such epoxides and curing of such polyepoxides.

15 Claims, No Drawings

HEAT-POLYMERIZABLE COMPOSITIONS COMPRISING EPOXIDE RESINS, AROMATIC SULFOXONIUM SALTS, AND ORGANIC OXIDANTS

BACKGROUND OF THE INVENTION

This invention relates to heat-polymerisable compositions comprising cationically-polymerisable epoxides, aromatic sulphoxonium salts, and organic oxidants, and to the use of these compositions as laminating resins, surface coatings, adhesives, and the like.

British Patent No. 1,516,511 discloses that curable compositions comprising a mono-1,2-epoxide, an epoxide resin (i.e., a substance containing on average more than one 1,2-epoxide group), or a polymerisable mixture thereof, may be polymerised or cured by means of a radiation-sensitive aromatic onium salt of oxygen, sulphur, selenium, or tellurium present in an amount capable of effecting the polymerisation or cure of the epoxide (or polyepoxide) by release of a Lewis Acid catalyst when exposed to radiant energy. The only such salts described in the Specification are of the formula $$[(R)_a(R^1)_b(R^2)_cX]_d^+ \ [MQ_e]^{(e-f)-} \qquad I$$

where

R denotes a monovalent aromatic radical, $R^1$ denotes an alkyl, cycloalkyl, or substituted alkyl group, $R^2$ denotes a polyvalent aliphatic or aromatic radical forming a heterocyclic or fused ring structure, X denotes oxygen, sulphur, selenium, or tellurium, M denotes an atom of a metal or a metalloid, such as antimony, iron, tin, bismuth, aluminium, gallium, indium, titanium, zirconium, scandium, vanadium, chromium, manganese, boron, phosphorus, or arsenic, Q denotes a halogen radical, a denotes 0, 1, 2, or 3, b denotes 0, 1, or 2, c denotes 0 or 1, the sum of (a+b+c) being 3 or the valency of X, d equals (e-f), f is the valency of M, and is an integer of from 2 to 7, and e is more than f and is an integer of up to 8.

The Specification also discloses that polymerisation or cure of the composition can be achieved by activating the onium salt to provide release of the Lewis Acid catalyst and that such activation may be achieved by heating the composition to a temperature in the range of from 150° C. to 250° C. (as well as by exposing it to irradiation).

In a subsequent PCT application (WO 80/01723) the same patentee described heat-curable compositions comprising a cationically polymerisable organic material, such as an epoxide resin, and a mixture of a dialkyl hydroxyaryl sulphonium salt and an organic oxidant, which latter term was used to include organic peroxides, iodoso aromatic compounds, and quinones, but also azo-bis(alkyl nitriles) such as azobis(isobutyronitrile). The dialkyl hydroxyaryl sulphonium salts cited are of the general formula $$[R(R^1)_aS]^+ \ [Y]^- \qquad II$$

where

R represents an aromatic radical of 6 to 20 carbon atoms, having from 1 to 3 nuclearly bonded hydroxy radicals, each $R^1$ represents the same or different alkyl radical of 1 to 8 carbon atoms or an alkylene radical capable of forming a cycloaliphatic or heterocyclic ring, $Y^-$ is a non-nucleophilic anion, and a is 1 or 2, being 1 when $R^1$ denotes an alkylene group and 2 when $R^1$ denotes an alkyl group.

Typical salts of formula II quoted are dimethyl 4-hydroxy-3,5-dimethoxyphenylsulphonium hexafluoroarsenate, dimethyl 4-hydroxy-3,5-dimethylphenylsulphonium hexafluoroantimonate, dimethyl 4-hydroxynaphth-1-ylsulphonium hexafluorophosphate, and 4-hydroxy-3,5-di-tert.butylphenylthiophenium hexafluoroarsenate.

In another PCT application by the same applicant (WO 80/01695) there were described curable compositions comprising a cationically polymerisable organic material and a curing agent consisting essentially of a dialkyl hydroxyaryl sulphonium salt of general formula II and an organic oxidant selected from iodoso aromatic organic compounds, quinones, and organic peroxides, the last being used in the presence of a decomposition accelerator which was an organic amine or a transition metal compound. The curable compositions were stated to provide flexible or rigid organic resin foams when used with a volatile organic solvent as a result of the exothermic cure.

Unpublished experiments by the present applicants have shown that certain aromatic sulphoxonium salts have no effect on epoxide compounds containing 2,3-epoxypropyl groups when heated with them for prolonged periods. Thus, a composition comprising 2 parts by weight of dimethylphenacylsulphoxonium hexafluorophosphate and 150 parts by weight of the most commonly employed, commercially available epoxide resin (2,2-bis(4-glycidyloxyphenyl)propane) did not gel on heating at 150° C. for 30 hours. In other experiments 4.5 parts, 3 parts, and 4 parts, respectively, by weight of acetanilinodimethylsulphoxonium hexafluorophosphate, p-methylacetanilinodimethylsulphoxonium hexafluorophosphate or of p-chloroacetanilinodimethylsulphoxonium hexafluorophosphate were used: the epoxide resin had not gelled after 30 hours at 120° C., 30 hours at 150° C., and 40 hours at 150° C. In the presence of certain oxidants, however, such compositions cured rapidly. Since aromatic sulphonium salts had been described in the above-mentioned prior art as having a heat-curing or heat-polymerising effect on epoxide resins, whereas the sulphoxonium salts in question appeared to exert no effect on prolonged heating with the epoxide resin, it was not to be expected that, in the presence of certain organic oxidants, these sulphoxonium salts would rapidly bring about heat-polymerisation and curing of the epoxide resin.

SUMMARY OF THE INVENTION

This invention accordingly provides heat-polymerisable compositions comprising (a) a compound containing at least one 2,3-epoxypropyl group directly attached to an oxygen atom, (b) a heat-polymerising amount of a mixture of (i) an aromatic sulphoxonium salt of formula

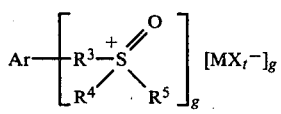

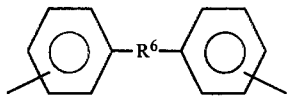

(ii) an organic oxidant selected from quinones, peroxides, and iodoso aromatic compounds, where Ar denotes a g-valent aromatic group of from 4 to 25 carbon atoms, $R^3$ denotes a group of formula —COCH$_2$—, —NHCOCH$_2$—, or

—CONHCOCH$_2$—, $R^4$ denotes an alkyl group of 1 to 18, preferably 1 to 12, carbon atom, an alkenyl group of 2 to 6 carbon atoms, a cycloalkyl group of 3 to 8 carbon atoms, a cycloalkylalkyl group of 4 to 10 carbon atoms, an aryl group of 4 to 25 carbon atoms, or an aralkyl group of 5 to 16 carbon atoms, $R^5$ has the same meaning as $R^4$ but may alternatively represent a dialkylamino group of 2 to 8 carbon atoms or, if $R^4$ denotes a said alkyl group, it may alternatively represent an arylamino group of 4 to 8 carbon atoms, M denotes an atom of a metal or of a metalloid, t is 4, 5, or 6 and is one more than the valency of M, X denotes a halogen atom, preferably of fluorine or chlorine, with the proviso that one X may denote a hydroxo group if M denotes antimony, t is 6, and the remaining five X each denote a fluorine atom, and g is 1 or 2.

Another aspect of this invention provides a process for the polymerisation of a compound containing at least one 2,3-epoxypropyl group directly attached to an oxygen atom, comprising subjecting a said heat-polymerisable composition of this invention to heat.

In formula III, Ar may denote a homocyclic or heterocyclic aryl or arylene group, $R^4$ and $R^5$ may denote a homocyclic or heterocyclic aryl or aralkyl group, and $R^5$ may alternatively represent a homocyclic or heterocyclic arylamino group; by "heterocyclic aryl", "heterocyclic arylene", and "heterocyclic aralkyl" is meant an aromatic group in which at least one —CH$_2$— or —CH= group of a ring of an aromatic compound is replaced by an atom other than carbon, usually nitrogen, oxygen, or sulphur. Examples of heterocyclic aryl groups are 2-furyl radicals and 2-pyridyl radicals and examples of heterocylic arylene groups are furan-2,4-diyl and pyridine-2,6-diyl radicals. Examples of heterocyclic aralkyl groups are 2-furylmethyl and 2-pyridylmethyl radicals, and examples of heterocyclic aralkylene groups are furan-2,4-dimethylene and pyridine-2,6-dimethylene radicals.

DESCRIPTION OF THE PREFERRED EMBODIMENTS

Preferably Ar denotes a homocyclic aryl or arylene group of 6 to 18 carbon atoms, for example, an anthrylene, phenanthrylene, or fluorenylene group: more particularly it represents a mononuclear or dinuclear group, especially a phenyl, naphthyl, phenylene, or naphthylene group, or a group of formula where $R^6$ denotes a carbon-carbon bond, an ether oxygen atom, a sulphur atom, or a radical of formula —CH$_2$—, —C(CH$_3$)$_2$—, or —SO$_2$—, which groups may be substituted in the ring or rings by one or two alkyl groups, each of 1 to 4 carbon atoms, by one or two alkoxy groups, each of 1 to 4 carbon atoms, by one or two nitro groups, or by one or two chlorine, bromine, or fluorine atoms.

Specific examples of suitable groups Ar are phenyl, p-chlorophenyl, 3,4-dichlorophenyl, o-tolyl, p-methoxyphenyl, 2,4-toluylene, 2,6-toluylene, o-, m-, and p-phenylene, and methylenebis-(p-phenylene).

$R^4$ and $R^5$ preferably each denote a phenyl or naphthyl group which may be substituted in the ring or rings by one or two alkyl groups, each of 1 to 4 carbon atoms, by one or two alkoxy groups, each of 1 to 4 carbon atoms, or by one or two fluorine, chlorine, or bromine atoms. More preferably they each denote an alkyl group of 1 to 4 carbon atoms and most preferably each denotes a methyl group.

M preferably denotes an atom of boron or bismuth, and more especially antimony, arsenic, or phosphorus. The anion or anions MX$_t^-$ may thus be, for example, hexachlorobismuthate or tetrafluoroborate, but most preferably hydroxopentafluoroantimonate, hexafluorophosphate, hexafluoroantimonate, or hexafluoroarsenate.

Specific examples of suitable sulphoxonium salts are:

dimethylphenacylsulphoxonium hexafluorophosphate and the corresponding hexafluoroantimonate, diphenylphenacylsulphoxonium hexafluorophosphate, 1,4-bis(1-oxo-2-(dimethylsulphoxonium)ethyl)benzene dihexafluoroarsenate and the corresponding dihexafluoroantimonate, acetanilinodimethylsulphoxonium hexafluorophosphate and the corresponding hexafluoroarsenate, 3,4-dichloroacetanilinodimethylsulphoxonium hexafluoroarsenate, acetanilinodimethylsulphoxonium tetrafluoroborate, p-methylacetanilinodimethylsulphoxonium hexafluorophosphate, benzoylcarbamoyldimethylsulphoxonium hexafluorophosphate, p-chloroacetanilinodimethylsulphoxonium hexafluorophosphate, and 2,4-bis(dimethylsulphoxoniummethylcarbamoyl)toluene dihexafluorophosphate.

The sulphoxonium salts of formula III may be prepared by the following procedures.

1. To prepare sulphoxonium salts of formula III where $R^3$ denotes —COCH$_2$—, Ar denotes an aryl group, and g is 1, an aroyl chloride, ArCOCl, such as benzoyl chloride or p-toluoyl chloride, is caused to react with a sulphoxonium ylide of formula

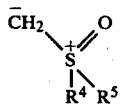

followed by neutralisation with an acid of formula HMX$_t$ (see U.S. Pat. No. 3,442,901). An acid anhydride, ArCO-O-COAr, may also be used as the acylating agent. Thus, reaction of 2 mol. of dimethylsulphoxonium methylide (VII) with benzoyl chloride (VIII) yields dimethylsulphoxoniumphenacyl ylide (IX), neutralisation of which with hexafluorophosphoric acid or tetrafluoroboric acid gives the corresponding hexafluorophosphate (X, MX$_t^-$ = PF$_6^-$) or tetrafluoroborate (X, MX$_t^-$ = BF$_4^-$). The hexafluorophosphate and similar salts such as the hexafluoroarsenate (X, MX$_t^-$ = PF$_6^-$ or AsF$_6^-$) may alternatively be obtained by double decomposition with the chloride.

As well as the ylide, a sulphoxonium salt is formed as coproduct; thus, in the formation of the ylide (IX), trimethylsulphoxonium chloride (XI) is obtained as co-product. Where, as in the present example, this co-product contains no aromatic group, it is not effective as a heat-polymerising agent. In general, it does not interfere but, if desired, may be separated from the required aracylsulphoxonium salt, e.g., by extraction of the latter into acetone.

Oxosulphonium ylides of formula V are accessible from sulphoxonium iodides of formula

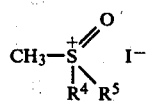

by treatment with strong bases such as sodium hydride (E. J. Corey and M. Chaykovsky, J. Amer. Chem. Soc., 1962, 84, 867).

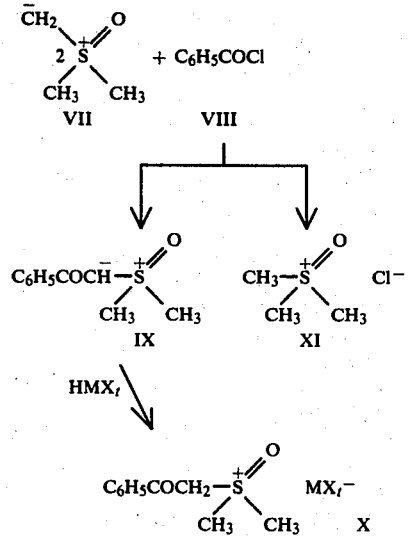

Reaction of 2 mol. of dimethylsulphoxonium methylide (VII) with benzoic anhydride yields a mixture of dimethylsulphoxoniumphenacyl ylide (IX) and trimethylsulphoxonium benzoate: the ylide may be separated from the benzoate and converted similarly into the chloride by neutralisation with hydrogen chloride. 2. To prepare bis-sulphoxonium salts of formula III where R$^3$ denotes —COCH$_2$— and g is 2, these may be obtained in an analogous manner from the sulphoxonium ylide of formula V and an aroylene dichloride of formula ClCOArCOCl.

3. Alternatively, to prepare a monosulphoxonium salt or bis-sulphoxonium salt of formula III where R$^3$ denotes —COCH$_2$— and g is 1 or 2, an α-diazoacetophenone of formula

or a bis(α-diazo) compound of formula

is reacted with, as appropriate, 1 or 2 mol. of a sulphoxide of formula R$^4$R$^5$SO in the presence of copper acetylacetonate, as described by M. Takebayashi et al. (Chemistry Letters, 1973, 809-12) to form an ylide of formula

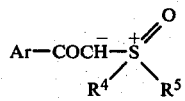

or a bis-ylide of formula

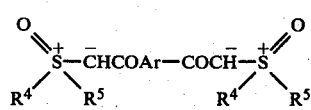

which is treated with an acid of formula HMX$_t$.

Sulphoxonium salts of formula III where R$^3$ denotes a carbamoyl-containing group may be prepared by the following procedures.

4. Those where R$^3$ denotes —NHCOCH$_2$— may be obtained by reaction of an aromatic isocyanate of formula ArNCO with an oxosulphonium ylide of formula V to give a carbamoyl ylide of formula

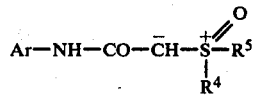

followed by neutralisation with an acid of formula HMX$_t$. Reaction of oxosulphonium ylides with aryl and aralkyl isocyanates is described by H. König and H. Metzger, Chem. Ber., 1965, 98, 3733-3747.

5. Analogues of the above compounds where R$^3$ denotes —CONHCOCH$_2$— may be made in a similar manner from an aracyl isocyanate of formula ArCONCO. The reaction of acyl isocyanates with dimethylsulphoxonium methylide is described by O. Tsuge et al., Tetrahedron, 1973, 29, 1983-1990.

Where a particular acid of formula HMX$_t$ is not available or is difficult to handle, salts such as hexafluorophosphates and hexafluoroantimonates may be made by double decomposition of the corresponding chlorides or other suitable salts. For example, diphenylphenacylsulphoxonium hexafluorophosphate may be obtained by precipitation on adding an aqueous solution of potassium hexafluorophosphate to an aqueous solution of diphenylphenacylsulphoxonium chloride. Hexafluoroantimonates may be made by addition of solid sodium hexafluoroantimonate or potassium hexafluoroantimonate to an aqueous solution of the sulphoxonium chloride: if the sodium or potassium hexafluoroantimonate is first dissolved in water, then, due to hydrolysis, the product isolated is the hydroxypentafluoroantimonate.

Component (a) may be, for example, a mono-1,2-epoxide containing a sole 2,3-epoxypropyl group, such as a glycidyl ether of a monohydric alcohol or phenol, e.g., n-butyl glycidyl ether or phenyl glycidyl ether; it also may be, e.g., a glycidyl ester such as glycidyl acrylate or glycidyl methacrylate. Preferably it is an epoxide resin, containing more than one 2,3-epoxypropyl group directly attached to an atom or atoms of oxygen per average molecule.

As examples of such resins may be mentioned polyglycidyl and poly($\beta$-methylglycidyl) esters obtainable by reaction of a compound containing two or more carboxylic acid groups per molecule with epichlorohydrin, glycerol dichlorohydrin, or $\beta$-methylepichlorohydrin in the presence of an alkali. Such polyglycidyl esters may be derived from aliphatic polycarboxylic acids, e.g., succinic acid, glutaric acid, adipic acid, pimelic acid, suberic acid, azelaic acid, sebacic acid, or dimerised or trimerised linoleic acid; from cycloaliphatic polycarboxylic acids such as tetrahydrophthalic acid, 4-methyltetrahydrophthalic acid, hexahydrophthalic acid, and 4-methylhexahydrophthalic acid; and from aromatic polycarboxylic acids such as phthalic acid, isophthalic acid, and terephthalic acid. Other suitable polyglycidyl esters are obtainable by polymerisation of glycidyl esters of vinylic acids, especially glycidyl acrylate and glycidyl methacrylate.

Further examples are polyglycidyl and poly($\beta$-methylglycidyl) ethers obtainable by reaction of a compound containing at least two free alcoholic hydroxyl and/or phenolic hydroxyl groups per molecule with the appropriate epichlorohydrin under alkaline conditions or, alternatively, in the presence of an acidic catalyst and subsequent treatment with alkali. These ethers may be made from acyclic alcohols such as ethylene glycol, diethylene glycol, and higher poly(oxyethylene) glycols, propane-1,2-diol and poly(oxypropylene) glycols, propane-1,3-diol, poly(oxytetramethylene) glycols, pentane-1,5-diol, hexane-2,4,6-triol, glycerol, 1,1,1-trimethylolpropane, pentaerythritol, sorbitol, and poly(epichlorohydrin); from cycloaliphatic alcohols such as resorcitol, quinitol, bis(4-hydroxycyclohexyl)methane, 2,2-bis(4-hydroxycyclohexyl)propane, and 1,1-bis(hydroxymethyl)cyclohex-3-ene; and from alchols having aromatic nuclei, such as N,N-bis(2-hydroxyethyl)aniline and p,p'-bis(2-hydroxyethylamino)diphenylmethane. Or they may be made from mononuclear phenols, such as resorcinol and hydroquinone, and from polynuclear phenols, such as bis(4-hydroxyphenyl)methane (otherwise known as bisphenol F), 4,4'-dihydroxydiphenyl, bis(4-hydroxyphenyl) sulphone, 1,1,2,2-tetrakis(4-hydroxyphenyl)ethane, 2,2-bis(4-hydroxyphenyl)propane, (otherwise known as bisphenol A), 2,2-bis(3,5-dibromo-4-hydroxyphenyl)propane, and novolaks formed from aldehydes such as formaldehyde, acetaldehyde, chloral, and furfuraldehyde, with phenol itself, and phenol substituted in the ring by chlorine atoms or by alkyl groups each containing up to nine carbon atoms, such as 4-chlorophenol, 2-methylphenol, and 4-tert.-butylphenol.

Epoxide resins having 2,3-epoxypropyl groups attached to different types of oxygen atoms may be employed, e.g., glycidyl 2-(glycidyloxy)benzoate and the diglycidyl derivative of phenolphthalein.

If desired, a mixture of epoxide resins may be used.

Especially preferred epoxide resins used in this invention are diglycidyl ethers, which may have been advanced, of dihydric phenols such as 2,2-bis(4-hydroxyphenyl)propane and bis(4-hydroxyphenyl)methane and of dihydric alcohols such as butane-1,4-diol.

If desired, the epoxide resin may be co-cured with a polyhydric alcohol, i.e., a compound having at least two alcoholic hydroxyl, preferably primary, groups per molecule. Preferably the polyhydric alcohol is present in a quantity sufficient to supply from 0.5 to 1.5, especially 0.75 to 1.25, alcoholic hydroxyl groups per 1,2-epoxide group of the epoxide resin. The polyhydric alcohol preferably contains, in addition to the alcoholic hydroxyl groups, only carbon, hydrogen, and, optionally, oxygen present as ether oxygen, acetal or carbonyl groups, and halogen atoms. It is further preferred that the polyhydric alcohol have a molecular weight of at least 100 and particularly more than 1000. Examples of suitable polyhydric alcohols are poly(oxyethylene) glycols, poly(oxypropylene)glycols, poly(oxytetramethylene) glycols, polyepichlorohydrins, poly(oxyethylene)-, poly(oxypropylene)-, and poly(oxytetramethylene) triols, obtainable by polymerisation of ethylene oxide, propylene oxide, or tetrahydrofuran in the presence of glycerol or 1,1,1-trimethylolpropane, hydroxyl-terminated polycaprolactones, copolymers of styrene with allyl alcohol, polyvinyl alcohols, hydroxypropylcellulose, hydroxyl-containing polyvinyl acetals, and partial esters of cellulose, e.g., a cellulose acetate butyrate.

Suitable quinones for use as the organic oxidant include for instance chloranil, 2,3-dichloro-5,6-dicyanobenzoquinone, and tetracyanoquinodimethane.

Suitable peroxides for use as the organic oxidant include for instance benzoyl peroxide, p-chlorobenzoyl peroxide, cumyl peroxide, lauroyl peroxide, cumene hydroperoxide, cyclohexanone peroxide, ethyl methyl ketone peroxide, di-isopropyl peroxydicarbonate, di-tert.butyl perphthalate, tert.butyl peracetate, and tert.butyl hydroperoxide. The peroxide may be used in conjunction with a tertiary amine, e.g., dimethylaniline, or a compound of a transition metal, especially a carboxylate such as a cobalt siccative (e.g., cobalt naphthenate), cobalt stearate, zinc octanoate, iron octanoate, stannous octanoate, or copper naphthenate, as accelerator.

Suitable iodosoaromatic compounds for use as the organic oxidant include for instance iodosobenzene, iodosobenzene diacetate, iodosobenzene bis(trifluoroacetate), 4-nitroiodosobenzene, and 4-chloroiodosobenzene diacetate.

As already indicated, the proportion used of the mixture of aromatic sulphoxonium salt and organic oxidant compared with that of component (a) corresponds to the amount effective for heat-polymerising the latter component. The proportion will depend on the nature of the sulphoxonium salt, the organic oxidant, and of the specific compound or compounds forming component (a) to be polymerised or cured, as well as on the presence or absence of accelerators such as tertiary amines or compounds of transition metals when the organic oxidant is a peroxide. Suitable proportions may readily be determined by those familiar with the art of heat-polymerisation. Usually, from 1 to 15, preferably 2 to 12.5, parts by weight of the mixture (b) are used per 100 parts by weight of the component (a). Generally, 1 part of the aromatic sulphoxonium salt will be used with from 1 to 3 parts by weight of the organic oxidant.

The aromatic sulphoxonium salt and the organic oxidant may be readily dispersed in the component (a) by milling them together, or making the sulphoxonium salt and the oxidant into a paste with γ-butyrolactone (which is a solvent for the sulphoxonium salt) and then mixing with the component (a).

Temperatures to which the compositions should be heated, and the duration for heating, for substantially complete conversion into the polymerised (or cured) form can readily be determined by routine tests; typically, the composition is heated at a temperature in the range 75° C. to 200° C., especially 90° to 170° C., and for from 1 to 30 minutes, usually, 1 to 12 minutes.

The new compositions may further contain additives such as fillers, reinforcing materials, colouring matter, flow control agents, flame inhibitors, and mould lubricants. Suitable extenders, fillers, and reinforcing materials are, for example, glass fibres, carbon fibres, ballotini, mica, quartz flour, calcium carbonate, cellulose, kaolin, wollastonite, colloidal silica having a large specific surface area, powdered poly(vinyl chloride), and powdered polyolefin hydrocarbons such as polyethylene and polypropylene.

The curable compositions of this invention may be used as laminating resins, paints and lacquers, impregnating and casting resins, potting and insulating compounds for the electrical industry, and adhesives, and also in the manufacture of such products.

The following Examples illustrate the invention; all parts and percentages are by weight. The accelerating effect is shown, as is conventional in this art, by the reduction in the time taken for the composition to gel, prior to curing: gelation times were determined by means of a "Techne" gelation timer, supplied by Techne (Cambridge) Limited, Duxford, Cambridge, England.

"Epoxide resin I" denotes a diglycidyl ether of 2,2-bis(4-hydroxyphenyl)propane having a 1,2-epoxide content of 5.16 equiv./kg.

"Epoxide resin II" denotes a diglycidyl ether of bis(4-hydroxycyclohexyl)methane, of 1,2-epoxide content 4.3 equiv./kg.

"Epoxide resin III" denotes diglycidyl hexahydrophthalate of 1,2-epoxide content 6.5 equiv./kg.

Sulphoxonium salts used in the Examples were prepared as follows:

Dimethylphenacylsulphoxonium hexafluorophosphate

Under an atmosphere of nitrogen, benzoyl chloride (11.4 parts) was added dropwise over 10 minutes to 300 parts of a 0.4 M solution of dimethylsulphoxonium methylide in tetrahydrofuran. The resulting mixture was stirred for 1.5 hours, and then hydrogen chloride gas was bubbled through the solution until no more precipitate appeared. After filtering off the precipitate and drying it under vacuum there remained 27.5 parts of a white powder consisting of dimethylphenacylsulphoxonium chloride admixed with trimethylsulphoxonium chloride.

The mixture (27.5 parts) obtained was dissolved in 150 parts of water, and thereto was added with stirring a solution of 40 parts of potassium hexafluorophosphate in 150 parts of water. After 30 minutes the precipitated solid was filtered off, washed with water, and dried under vacuum at 50°-60° C.

A sample (6 parts) of the dried solid was extracted with 20 parts of acetone. Evaporation of the acetone left 4 parts of the desired dimethylphenacylsulphoxonium hexafluorophosphate (III, Ar=$C_6H_5$, $R^3$=COCH$_2$, $R^4$=$R^5$=CH$_3$, MX$_t^-$=PF$_6^-$, g=1), essentially free of the trimethylsulphoxonium salt, as a pale yellow solid, m.pt. 161°-3° C. On recrystallisation from methanol, colourless plates, m.pt. 171° C., were obtained. NMR (acetone —$d_6$) 4.15 (s—6H) 6.10 (s—2H), 7.95 (m—5H); IR (KBr disc) 3020, 2960, 2920, 1675, 1590, 1330, 1310, 1230, 1190, 1035, 980, and 840 cm$^{-1}$; UV (ethanol) $\lambda_{max}$=254 nm.

Dimethylphenacylsulphoxonium hexafluorophosphate was also prepared by adding the benzoyl chloride to the solution of dimethylsulphoxonium methylide as before, then adding dropwise over 20 minutes 45 parts of hexafluorophosphoric acid-diethyl ether complex, stirring for a further 1½ hours, filtering off the precipitate and drying it in a vacuum (47 parts of a mixture of trimethylsulphoxonium hexafluorophosphate and dimethylphenacylsulphoxonium hexafluorophosphate being obtained), and then extracting the desired phenacyl compound into acetone as before.

Acetanilinodimethylsulphoxonium hexafluorophosphate

Dimethyl-N-phenylcarbamoyloxosulphonium ylide (10.5 parts), prepared as described by König and Metzger, Chem. Ber., 1965, 98, 3740, was dissolved in 110 parts of 0.5 M hydrochloric acid. To this was added, with stirring, a solution of 9.5 parts of potassium hexafluorophosphate in water. The white solid which separated was filtered off, washed with water, and recrystallised from ethanol, to give 8 parts of the desired product (III, Ar=$C_6H_5$, $R^3$=NHCOCH$_2$, $R^4$=$R^5$=CH$_3$, MX$_t^-$=PF$_6^-$, g=1), m.pt. 141°-5° C.; NMR (acetone —$d_6$) 4.17 (s—6H), 5.41 (s—2H), 7.1-7.6 (m—5H), 9.90 (s—1H); IR (KBr disc) 3310, 3030, 3015, 3000, 2960, 2880, 1665, 1600, 1560, 1490, 1440, 1340, 1240, 1030, 950, 840, 760 cm$^{-1}$; UV (ethanol) $\lambda_{max}$ 269 nm.

Acetanilinodimethylsulphoxonium hexafluoroarsenate

This was made in the same manner, substituting an equivalent amount of potassium hexafluoroarsenate for the hexafluorophosphate.

Acetanilinodimethylsulphoxonium tetrafluoroborate

This was made in the same manner, substituting an equivalent amount of sodium tetrafluoroborate.

p-Methylacetanilinodimethylsulphoxonium hexafluorophosphate

Dimethyl-N-(p-tolyl)carbamoyloxosulphonium ylide (22.5 parts), prepared similarly, was stirred with 200 parts of 0.5 M hydrochloric acid, and thereto was added while stirring a solution of 37 parts of potassium hexafluorophosphate in water. After 30 minutes the precipitate was filtered off, washed with water, and dried: 60 parts were obtained of the desired product (III, Ar=p-CH$_3$C$_6$H$_4$, $R^3$=NHCOCH$_2$, $R^4$=$R^5$=CH$_3$, MX$_t^-$=PF$_6^-$, g=1), m.pt. 131°-3° C.; NMR (acetone —$d_6$) 4.17 (s—6H), 5.43 (s—2H), 7.3-7.8 (m—4H), 10.05 (s—1H); IR (KBr disc) 3260, 3040, 2980, 2930, 1660, 1540, 1490, 1400, 1320, 1240, 1090, 1040, 840 cm$^{-1}$; UV (ethanol) $\lambda_{max}$ 273 nm.

p-Chloroacetanilinodimethylsulphoxonium hexafluorophosphate

Dimethyl-N-(p-chlorophenyl)carbamoyloxosulphonium ylide (49 parts), prepared similarly, was stirred in 400 parts of 0.5 M hydrochloric acid, and thereto was added while stirring a solution of 37 parts of potassium hexafluorophosphate in water. After 30 minutes the precipitate was filtered off, washed with water, and dried: 60 parts were obtained of the desired product (III, Ar=p-ClC$_6$H$_4$, R$^3$=NHCOCH$_2$, R$^4$=R$^5$=CH$_3$, g=1, MX$_t^-$=PF$_6^-$), m.pt. 161°-3° C.; NMR (acetone —d$_6$) 4.17 (s—6H), 5.43 (s—2H), 7.3-7.8 (m—4H), 10.05 (s—1H); IR (KBr disc) 3260, 3040, 2980, 2930, 1660, 1540, 1490, 1400, 1320, 1240, 1090, 1040, 840 cm$^{-1}$; UV (ethanol) $\lambda_{max}$ 273 nm.

3,4-Dichloroacetanilinodimethylsulphoxonium hexafluoroarsenate

Dimethyl-N-(3,4-dichlorophenyl)carbamoyloxosulphonium ylide (56 parts), prepared similarly, was stirred with 400 parts of 0.5 M hydrochloric acid, and a solution of 46 parts of potassium hexafluoroarsenate in 250 parts of water was added with stirring. After 30 minutes the solid was filtered off, washed with water, and recrystallised from ethanol. There was thereby obtained 27 parts of the desired product (III, Ar=3,4—Cl$_2$C$_6$H$_3$, R$^3$=NHCOCH$_2$, R$^4$=R$^5$=CH$_3$, g=1, MX$_t^-$=AsF$_6^-$), m.pt. 125°-9° C.; NMR (acetone —d$_6$) 4.22 (s—6H), 5.50 (s—2H), 7.50 (m—2H), 8.03 (m—1H), 10.50 (s—1H); IR (KBr disc) 3650, 3535, 3100, 3020, 2970, 2930, 2850, 1675, 1605, 1530, 1470, 1380, 1330, 1220, 1170, 1050, 710 cm$^{-1}$; UV (ethanol) $\lambda_{max}$ 275 nm.

Benzoylcarbamoyldimethylsulphoxonium hexafluorophosphate

Dimethylsulphoxoniumbenzoylcarbamoyl methylide, prepared as described by Tsuge et al., Tetrahedron, 1973, 29, 1983, (4.8 parts) was stirred with 50 parts of 0.5 M hydrochloric acid, and then a solution of 3.7 parts of potassium hexafluorophosphate in water was added. The white solid was filtered off, washed with water, and dried under vacuum to give 7 parts of the desired product (III, Ar=C$_6$H$_5$, R$^3$=CONHCOCH$_2$, R$^4$=R$^5$=CH$_3$, g=1, MX$_t^-$=PF$_6^-$); NMR (acetone —d$_6$) 4.19 (s—6H), 6.02 (s—6H), 6.02 (s—2H), 7.5-8.2 (m—5H), 9.95 (s—1H); IR (KBr disc) 3320, 1710, 1680, 1460, 1360, 1320, 1240, 1170, 1040, 840, 710 cm$^{-1}$; UV (ethanol) $\lambda_{max}$ 274 nm.

Other aromatic sulphoxonium salts which may be used in the compositions of this invention may be made as follows:

Dimethylphenacylsulphoxonium hexafluoroantimonate

A further sample (5 parts) of the mixture of dimethylphenacylsulphoxonium chloride and trimethylsulphoxonium chloride prepared from benzoyl chloride and dimethylsulphoxonium methylide was dissolved in 50 parts of water and thereto was added with stirring 6.7 parts of sodium hexafluoroantimonate. After 30 minutes the precipitated solid was filtered off, washed with water, and dried under vacuum. There was thus obtained 8 parts of a mixture of dimethylphenacylsulphoxonium hexafluoroantimonate (III, Ar=C$_6$H$_5$, R$^3$=COCH$_2$, R$^4$=R$^5$=CH$_3$, g=1, MX$_t^-$=SbF$_6^-$) and trimethylsulphoxonium hexafluoroantimonate. The former could be separated by recrystallisation from methanol.

1,4-Bis(1-oxo-2-(dimethylsulphoxonium)ethyl)benzene dihexafluoroarsenate

Under an atmosphere of nitrogen, terephthaloyl chloride (8.5 parts) dissolved in 18 parts of tetrahydrofuran was added dropwise over 30 minutes to 300 parts of a 0.4 M solution of dimethylsulphoxonium methylide in tetrahydrofuran. After the mixture had been stirred for 1.5 hours, hydrogen chloride gas was bubbled through until no more precipitate was formed. The mixture was then stirred for a further hour, and the solid was filtered off and dried under vacuum.

A sample of this solid (5 parts) was stirred with 50 parts of water, and a solution of potassium hexafluoroarsenate (15 parts) in 100 parts of water was added. After the mixture had been stirred for 30 minutes, the solid was filtered off, and then recrystallised several times from methanol. There was thereby obtained, substantially free from trimethylsulphoxonium hexafluoroarsenate, the desired product (III, Ar=C$_6$H$_4$, R$^3$=COCH$_2$, R$^4$=R$^5$=CH$_3$, g=2, MX$_t^-$=AsF$_6^-$) as pale yellow crystals, m.pt. 188°-90° C.; NMR (acetone -d$_6$) 4.20 (s-12H), 6.30 (s-4H), 8.32 (s-4H); IR (KBr disc) 3020, 2930, 1685, 1405, 1310, 1235, 1035, 980, 950, and 700 cm$^{-1}$; UV (ethanol) $\lambda_{max}$=311 nm.

1,4-Bis(1-oxo-2-(dimethylsulphoxonium)ethyl)benzene dihexafluoroantimonate

A further sample (5 parts) of the mixture of 1,4-bis(1-oxo-2-(dimethylsulphoxonium)ethyl)benzene dichloride and trimethylsulphoxonium chloride was stirred with 100 parts of water and to this suspension was added in portions 18 parts of potassium hexafluoroantimonate. After stirring for a further 30 minutes, the mixture of 1,4-bis(1-oxo-2-(dimethylsulphoxonium)ethyl)benzene dihexafluoroantimonate (III, Ar=C$_6$H$_4$, R$^3$=COCH$_2$, R$^4$=R$^5$=CH$_3$, g=2, MX$_t^-$=SbF$_6^-$) and trimethylsulphoxonium hexafluoroantimonate so obtained was filtered off and dried under vacuum. The desired salt could be separated from the trimethylsulphoxonium salt by recrystallisation from methanol.

Diphenylphenacylsulphoxonium hexafluorophosphate

Diphenylsulphoxonium phenacylide was prepared by the reaction of α-diazoacetophenone with diphenyl sulphoxide in the presence of copper acetylacetonate as described by Takebayashi et al. (Chemistry Letters, 1973, 809). Hydrogen chloride gas was passed through a solution of this ylide in toluene until no more precipitate was formed. This precipitate was filtered off, dried under vacuum, and then dissolved in water. An equimolar amount of an aqueous solution of potassium hexafluorophosphate was added and, after stirring for 15 minutes, the precipitated diphenylphenacylsulphoxonium hexafluorophosphate (III, Ar=C$_6$H$_5$, R$^3$=COCH$_2$, R$^4$=R$^5$=C$_6$H$_5$, g=1, MX$_t^-$=PF$_6^-$) was separated off and dried under vacuum.

2,4-Bis(dimethylsulphoxoniummethylcarbamoyl)toluene dihexafluorophosphate

The bis(dimethyloxosulphurylene ylide) (3.6 parts), prepared by the reaction of toluene-2,4-di-isocyanate with 2 molar proportions of dimethylsulphoxonium methylide following the method of König and Metzger (loc. cit.) was stirred with 40 parts of 0.5 M hydrochloric acid. Potassium hexafluorophosphate (3.7 parts) dissolved in water was added and the mixture was stirred for 15 minutes. The solid was filtered off, washed with water, and dried under vacuum; 5 parts of the desired product (III, Ar=2,4—C$_6$H$_3$(CH$_3$), R$^3$=NHCOCH$_2$, R$^4$=R$^5$=CH$_3$, g=2, MX$_t^-$=PF$_6^-$) were obtained.

EXAMPLE 1

Dimethylphenacylsulphoxonium hexafluorophosphate (0.2 g) was mixed to a paste with 0.2 g of γ-butyrolactone and dispersed in 15 g of Epoxide Resin I, then heated at 150° C. for 30 hours. The composition did not gel.

A larger quantity, viz., 0.45 g, of the same sulphoxonium salt was mixed with 0.9 g of γ-butyrolactone and heated with 15 g of Epoxide Resin I in the presence of 0.45 g of azobis(isobutyronitrile) at 100° C. When the test was terminated 18 hours later, the composition had still not gelled. (Azobis(isobutyronitrile) is quoted as a suitable oxidant in WO/01723.)

In each of three further experiments, 0.45 g of the same sulphoxonium salt was mixed with 0.9 g of γ-butyrolactone, 15 g of Epoxide Resin I, and with 0.9 g of iodosobenzene diacetate or with 0.45 g of 2,6-dichloro-5,6-dicyanobenzoquinone, or with 0.45 g of tetracyanoquinodimethane, and the mixtures were heated at 120° C. The gel times were, respectively, 6 minutes, 4 minutes, and 22 minutes.

EXAMPLE 2

Dimethylphenacylsulphoxonium hexafluorophosphate (0.45 g) and either benzoyl peroxide (0.45 g) or chloranil (0.45 g) were mixed into a paste with 0.9 g of γ-butyrolactone and heated with 15 g of Epoxide Resin I at 160° C. The gel times were, respectively, 1 minute and 11 minutes. In another experiment, a further sample of the mixture containing benzoyl peroxide was heated at 100° C.; the gel time was 18 minutes.

EXAMPLE 3

Acetanilinodimethylsulphoxonium hexafluorophosphate (0.45 g), γ-butyrolactone (0.9 g), and 15 g of Epoxide Resin I were heated at 120° C.: the mixture had not gelled when the test was discontinued after 30 hours' heating. The test was repeated, the mixture also containing 0.45 g of 2,3-dichloro-5,6-dicyanobenzoquinone: the gel time at 120° C. was 4 minutes.

EXAMPLE 4 p-Methylacetanilinodimethylsulphoxonium hexafluorophosphate (0.3 g) was mixed with 0.3 g of γ-butyrolactone and then with 15 g of Epoxide Resin I, and the composition was heated at 150° C. for 30 hours. The composition did not gel. In another experiment, 0.24 g of the same sulphoxonium salt and 0.48 g of γ-butyrolactone was mixed with 15 g of Epoxide Resin I and 0.24 g of 2,3-dichloro-5,6-dicyanobenzoquinone and heated at 160° C. The composition gelled in 5 minutes.

EXAMPLE 5

Acetanilinodimethylsulphoxonium hexafluoroarsenate (0.45 g) and 2,3-dichloro-5,6-dicyanobenzoquinone (0.45 g) were made into a paste with 0.9 g of γ-butyrolactone and heated with 15 g of Epoxide Resin I at 120° C.: the resin gelled in 5 minutes. The experiment was repeated, omitting the quinone: gelation had not occurred when the test was discontinued after 2 hours heating.

EXAMPLE 6

The following compositions were prepared and heated at 160° C. (compositions 'a' and 'b') or at 120° C. (compositions 'c' and 'd').

|  | weight (g) | | | |
|---|---|---|---|---|
|  | a | b | c | d |
| 3,4-dichloroacetanilinodimethyl-sulphoxonium hexafluoroarsenate | 0.45 | 0.45 | 0.45 | 0.45 |
| γ-butyrolactone | 0.45 | 0.9 | 0.9 | 0.9 |
| chloranil | — | 0.45 | — | — |
| 2,3-dichloro-5,6-dicyanobenzoquinone | — | — | 0.45 | — |
| benzoyl peroxide | — | — | — | 0.45 |
| Epoxide Resin I | 33 | 15 | 15 | 15 |
| Gel times (minutes) | 430 | 8 | 5 | 8 |

The much shorter gel times of compositions 'b', 'c' and 'd', compared with that of composition 'a' (which is not a composition of this invention) even though two of them were heated at only 120° C. instead of 160° C., are particularly noteworthy.

EXAMPLE 7

The following compositions were heated at 150° C. and their gel times were noted:

|  | weight (g) | |
|---|---|---|
|  | e | f |
| p-chloroacetanilinodimethyl-sulphoxonium hexafluorophosphate | 0.3 | 0.3 |
| γ-butyrolactone | 0.6 | 0.6 |
| benzoyl peroxide | — | 0.3 |
| Epoxide Resin I | 15 | 15 |
| Gel time (minutes) | — | 12 |

Composition 'e', included for comparison, had not gelled when the test was concluded after 40 hours. The accelerating effect of the oxidant (composition 'f' of this invention) is clearly shown.

EXAMPLE 8

Benzoylcarbamoyldimethylsulphoxonium hexafluorophosphate (0.45 g) was made into a paste with γ-butyrolactone, mixed with 15 g of Epoxide Resin I, and heated at 120° C.: the experiment was discontinued after 30 hours, when gelation had not occurred. The experiment was repeated, with 0.45 g of 2,3-dichloro-5,6-dicyanobenzoquinone also present: the gel time was only 12 minutes.

EXAMPLE 9

Acetanilinodimethylsulphoxonium hexafluorophosphate (0.9 g) was dissolved in an equal weight of γ-butyrolactone and mixed with 15 g of Epoxide resin II. The mixture was heated at 120° C. A soft gel was formed only on heating for 4 hours.

The experiment was repeated, the mixture containing in addition 0.45 g of benzoyl peroxide. The gel time was 30 minutes.

EXAMPLE 10

Epoxide resin III (15 g) was mixed with 0.9 g of acetanilinodimethylsulphoxonium hexafluorophosphate dissolved in 0.9 g of γ-butyrolactone and with 0.9 g of benzoyl peroxide, and then heated at 110° C. A soft gel formed after 1 hour.

When the experiment was repeated, omitting the benzoyl peroxide, the mixture had not even thickened when the experiment was terminated after heating for 5 hours.

For purposes of comparison, Epoxide resin III (15 g) was mixed with 0.45 g of 2,3-dichloro-5,6-dicyanobenzoquinone, 0.9 g of γ-butyrolactone, and 0.45 g of an aliphatic sulphoxonium salt, viz. trimethylsulphoxonium hexafluorophosphate, and heated at 120° C. When the experiment was terminated after heating for 2 hours the mixture had not gelled.

EXAMPLE 11

A mixture of 15 g of Epoxide resin I, 0.7 g of acetanilinodimethylsulphoxonium hexafluorophosphate, and 0.63 g cumene hydroperoxide, heated at 120° C., gelled after heating for 70 minutes. When, for purposes of comparison, the experiment was repeated with an inorganic oxidant, namely ammonium persulphate (0.45 g), made into a paste with 0.9 g of γ-butyrolactone, instead of the cumene hydroperoxide, the mixture had not gelled when the experiment was discontinued after heating for 3 hours at 120° C. In a further experiment, another inorganic oxidant, potassium permanganate (0.3 g) made into a paste with 0.9 g of γ-butyrolactone, was used for comparison instead of cumene hydroperoxide: after the mixture had been heated for 3 hours at 120° C. without gelling the experiment was discontinued.

EXAMPLE 12

A mixture of 15 g of Epoxide resin I, 0.45 g of acetanilinodimethylsulphoxonium tetrafluoroborate made into a paste with 0.45 g of γ-butyrolactone, and 0.45 g of 2,3-dichloro-5,6-dicyanbenzoquinone, on heating at 120° C., gelled in 5 minutes. A similar mixture, omitting the quinone, was heated at 120° C.; the mixture had not gelled after 4 hours.

What is claimed is:
1. Heat-polymerisable compositions comprising
   (a) a compound containing at least one 2,3-epoxypropyl group directly attached to an oxygen atom,
   (b) a heat-polymerising amount of a mixture of
   (i) an aromatic sulfoxonium salt of formula

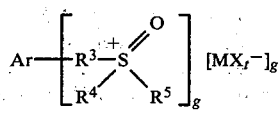

III (ii) an organic oxidant selected from quinones, peroxides, and iodoso aromatic compounds, where
   Ar denotes a g-valent aromatic group of 4 to 25 carbon atoms,
   $R^3$ denotes a group of formula —COCH$_2$—, —NHCOCH$_2$—, or —CONHCOCH$_2$—,
   $R^4$ denotes an alkyl group of 1 to 18 carbon atoms, an alkenyl group of 2 to 6 carbon atoms, a cycloalkyl group of 3 to 8 carbon atoms, a cycloalkylalkyl group of 4 to 10 carbon atoms, an aryl group of 4 to 25 carbon atoms, or an aralkyl group of 5 to 16 carbon atoms,
   $R^5$ denotes an alkyl group of 1 to 18 carbon atoms, an alkenyl group of 2 to 6 carbon atoms, a cycloalkyl group of 3 to 8 carbon atoms, a cycloalkylalkyl group of 4 to 10 carbon atoms, an aryl group of 4 to 25 carbon atoms, an aralkyl group of 5 to 16 carbon atoms, or a dialkylamino group of 2 to 8 carbon atoms, with the proviso that if $R^4$ denotes an alkyl group of 1 to 18 carbon atoms then $R^5$ may alternatively denote an arylamino group of 4 to 8 carbon atoms,
   M denotes an atom of a metal or of a metalloid,
   t is 4, 5, or 6 and is one more than the valence of M,
   X denotes a halogen atom, with the proviso that one X may denote a hydroxo group if M denotes antimony, t is 6, and the remaining five X each denote a fluorine atom, and
   g is 1 or 2.

2. The compositions of claim 1 in which Ar denotes a homocyclic aryl or arylene group of 6 to 18 carbon atoms.

3. The compositions of claim 2 in which Ar denotes a phenyl, naphthyl, phenylene, or naphthylene group, a group of formula

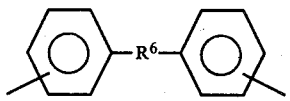

IV or a phenyl, naphthyl, phenylene, or naphthylene group, or a group of formula IV substituted in the ring or rings by from one to two substituents chosen from alkyl groups, each of 1 to 4 carbon atoms, alkoxy groups, each of 1 to 4 carbon atoms, nitro groups, and chlorine, bromine, or fluorine atoms,
wherein $R^6$ denotes a carbon-carbon bond, an ether oxygen atom, a sulfur atom, or a radical of formula —CH$_2$—, —C(CH$_3$)$_2$—, or —SO$_2$—.

4. The compositions of claim 1 in which $R^4$ and $R^5$ each denote an alkyl group of at most 12 carbon atoms, a phenyl or a naphthyl group, or a phenyl or naphthyl group which is substituted in the ring or rings by from one to two substituents chosen from alkyl groups, each of 1 to 4 carbon atoms, alkoxy groups, each of 1 to 4 carbon atoms, and fluorine and bromine atoms.

5. The compositions of claim 1 in which $R^4$ and $R^5$ each denote an alkyl group of 1 to 4 carbon atoms.

6. The compositions of claim 1 in which $MX_t^-$ denotes tetrafluoroborate, hexachlorobismuthate, hydroxopentafluoroantimonate, hexafluorophosphate, hexafluoroantimonate, or hexafluoroarsenate.

7. The compositions of claim 1, in which (i) is selected from
   dimethylphenacylsulfoxonium hexafluorophosphate,
   dimethylphenacylsulfoxonium hexafluoroantimonate,
   diphenylphenacylsulfoxonium hexafluorophosphate,
   1,4-bis(1-oxo-2-(dimethylsulfoxonium)ethyl)benzene dihexafluoroarsenate,
   1,4-bis(1-oxo-2-(dimethylsulfoxonium)ethyl)benzene dihexafluoroantimonate,
   acetanilinodimethylsulfoxonium hexafluorophosphate,
   acetanilinodimethylsulfoxonium hexafluoroarsenate,
   p-methylacetanilinodimethylsulfoxonium hexafluorophosphate,
   benzoylcarbamoyldimethylsulfoxonium hexafluorophosphate, 3,4-dichloroacetanilinodimethylsulfoxonium hexafluoroarsenate,
acetanilinodimethylsulfoxonium tetrafluoroborate,
p-chloroacetanilinodimethylsulfoxonium hexafluorophosphate, and
2,4-bis(dimethylsulfoxoniummethylcarbamoyl)toluene dihexafluorophosphate.

8. The compositions of claim 1 in which (a) is a diglycidyl ether of a dihydric phenol or a diglycidyl ether of a dihydric alcohol.

9. The compositions of claim 1 in which the organic oxidant (ii) is chloranil, 2,3-dichloro-5,6-dicyanobenzoquinone, tetrachloro-o-benzoquinone, or tetracyanoquinodimethane.

10. The compositions of claim 1 in which the organic oxidant (ii) is benzoyl peroxide, p-chlorobenzoyl peroxide, cumyl peroxide, lauroyl peroxide, cumene hydroperoxide, cyclohexanone peroxide, ethyl methyl ketone peroxide, di-isopropyl peroxydicarbonate, di-tert.butyl perphthalate, tert.butyl peracetate, or tert.butyl hydroperoxide.

11. The compositions of claim 1 in which the organic oxidant (ii) is iodosobenzene, iodosobenzene diacetate, iodosobenzene bis(trifluoroacetate), 4-nitroiodosobenzene, or 4-chloroiodosobenzene diacetate.

12. The composition of claim 1 containing 1 to 15 parts by weight of the mixture (b) per 100 parts by weight of (a).

13. The compositions of claim 1 in which the mixture (b) comprises from 1 to 3 parts by weight of the organic oxidant (ii) per part by weight of the aromatic sulfoxonium salt (i).

14. A process for the polymerisation of a compound containing at least one 2,3-epoxypropyl group directly attached to an oxygen atom, comprising heating a composition as claimed in claim 1.

15. The process of claim 14 in which the heat-polymerisable composition is heated at a temperature in the range 75° C. to 200° C. for from 1 to 30 minutes.

* * * * *